United States Patent [19]

Ray

[11] Patent Number: 4,520,920
[45] Date of Patent: Jun. 4, 1985

[54] VARIABLE STROKE DRIVE MECHANISM
[75] Inventor: Joe R. Ray, San Jose, Calif.
[73] Assignee: Noble Automated Systems, Inc., San Jose, Calif.
[21] Appl. No.: 433,227
[22] Filed: Oct. 7, 1982
[51] Int. Cl.³ .............................................. B65G 27/00
[52] U.S. Cl. ....................................... 198/761; 74/26; 198/766
[58] Field of Search ....................... 198/753, 761, 766; 74/26; 222/161

[56] References Cited

U.S. PATENT DOCUMENTS

| | | | |
|---|---|---|---|
| 1,089,633 | 3/1914 | Franz | 74/26 |
| 2,947,410 | 8/1960 | Carrier, Jr. | 198/163 |
| 3,099,349 | 7/1963 | Sinden | 198/766 |
| 3,236,381 | 2/1966 | Poynter | 198/761 X |
| 3,250,380 | 5/1966 | Allen et al. | 74/26 X |
| 3,547,252 | 12/1970 | Brown et al. | 198/761 |
| 3,567,012 | 3/1971 | Mendoza | 198/761 |
| 3,901,380 | 8/1975 | Zier et al. | 198/766 |
| 3,945,513 | 3/1976 | Scheffler | 414/156 |
| 4,088,223 | 5/1978 | Bertrand | 198/761 |

Primary Examiner—Joseph E. Valenza
Assistant Examiner—Stuart J. Millman
Attorney, Agent, or Firm—Jack M. Wiseman; Francis W. Anderson

[57] ABSTRACT

A mechanism for controlling the rate of discharge of material from the feed pan of a material feeder includes an eccentric drive mechanism operatively connected to the pan to reciprocate it, and a linkage connected to the pan-reciprocating mechanism to vary the effective throw of the drive mechanism.

3 Claims, 6 Drawing Figures

VARIABLE STROKE DRIVE MECHANISM

BACKGROUND OF THE INVENTION

Crushed or processed bulk material, such as stone aggregate and the like, is often stored in a hopper and later directed by means of a conveying system to a desired work station. The rate at which the material is delivered to the work station depends upon the particular operation; some operations requiring that the material be delivered at a fairly rapid rate while others require that the material be fed to the station at a very slow rate. Also, the speed with which a particular operation is carried out can vary so that material is required at different rates at different times. It is therefore desirable that any mechanism that is to be used to feed granular material or the like from a hopper to a conveyor be capable of delivering the material at rates which may be varied from a full flow rate to a dribble.

Mechanisms have been provided for varying the rate of discharge of material from a feeder and, while these mechanisms have some advantageous features, none of them have applied the principles of the present invention to accomplish effective, controlled discharge throughout a range of discharges, especially at the low discharge end of the range.

One prior art mechanism includes a variable speed drive having pulleys which are adjustable to vary the effective diameter of the drive sheave. Such a device is shown in the patent to Poynter, U.S. Pat. No. 3,236,381. Other drive mechanisms are disclosed in the patents to Franz, U.S. Pat. No. 1,089,633; to Carrier, U.S. Pat. No. 2,947,410; to Sinden, U.S. Pat. No. 3,099,349; to Brown, U.S. Pat. No. 3,547,252; to Mendoza, U.S. Pat. No. 3,567,012; to Scheffler, U.S. Pat. No. 3,945,513; to Zier et al., U.S. Pat. No. 3,901,380; and to Bertrand, U.S. Pat. No. 4,088,223.

The mechanism of the present invention features an eccentric drive unit adapted to reciprocate a feed pan on which material is disposed so that the material is discharged over the edge of the pan during its reciprocating movement. A novel control mechanism is operatively connected to the drive mechanism and provides means whereby the amount of reciprocation of the pan can be varied to control the amount of material discharged during each reciprocation.

An object of the present invention therefore is to provide an advantageous, effective, variable-throw drive mechanism for a feeder.

SUMMARY OF THE INVENTION

A control mechanism is effective to vary, by means of a pivoting linkage, the distance a drive unit can reciprocate the pan of a material feeder.

DESCRIPTION OF A PREFERRED EMBODIMENT

Figure 1:
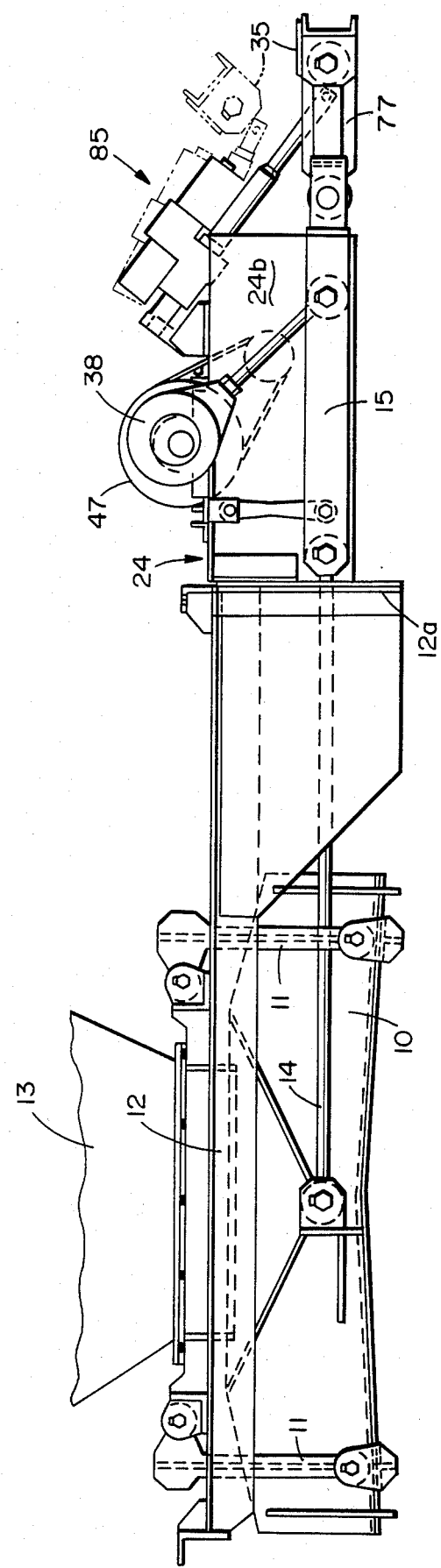
FIG. 1 is a fragmentary, diagrammatic side elevation of the drive mechanism of the present invention shown attached to the pan of a material feeder.

The drive mechanism of the present invention is particularly adapted to oscillate a feed pan 10 of a dual-flow material feeder that is supported by hanger arms 11 from a support structure 12 which includes a hopper 13. The drive is connected to the feed pan by two connecting rods 14 (FIG. 3) each of which projects away from feed pan and passes with a considerable amount of clearance through an opening in an end wall 12a of the support structure and is pivotally connected to one of two drive members 15 of the present drive mechanism.

Figure 4:
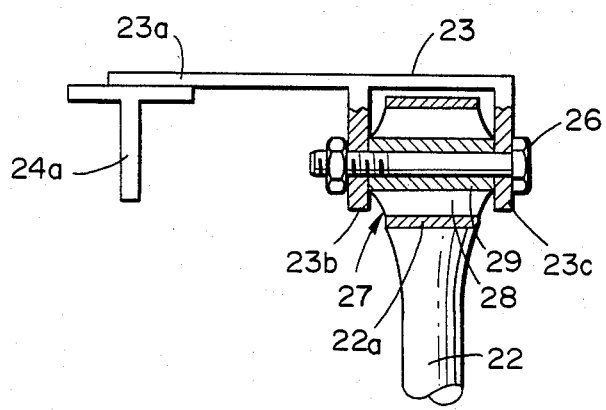
FIG. 4 is an enlarged diagrammatic section taken along line 4—4 of FIG. 3.

Each drive member 15 includes a pair of side bars 16 connected at one end by an end plate 17. The tubular end 14a of the associated connecting rod 14 is journalled in a bushing that is held in place between the side bars 16 by a bolt 18. The bolt 18 extends through the bushing and is threaded into a block 19 welded to the outer face of the adjacent side bar. At a point near its connection to the connecting rod 14, each drive member 15 is supported by a hanger arm 22 that is pivotally connected at its upper end in a yoke 23 (FIG. 4). The yoke has a flat arm 23a welded to the upper surface of one of two side rails 24a of a rigid drive box 24 which includes two spaced side plates 24b connected at one end by a transverse channel 24c and at the other end by a transverse plate 24d and vertical angles 24e that are bolted to the end wall 12a of the feeder.

A bolt 26 (FIG. 4) extends across the space between two depending arms 23b and 23c of the yoke 23 and through a unit 27 which includes a rubber annulus 28 that is vulcanized on the outer surface of a short tube 29 and is pressed in the bore of a tubular end 22a of the hanger arm 22. At its lower end the hanger arm is pivotally connected between the side bars 16 of the drive member 15 by means of a bolt 30 and a mounting unit 31 which is identical to the unit 27 shown in FIG. 4. In installations in which the drive mechanism is not furnished as a self-contained, bolted-on unit, the connecting rods 14 may be welded to the ends of the drive members 15 and, in this case, the hanger arms 22 are not needed.

At the end adjacent the transverse end plate 17, each drive member 15 is pivotally-connected to a stroke-adjusting mechanism 35 which will be described presently.

Each drive member is reciprocated in the general directions indicated by the double-headed arrow 33 by means of an eccentric drive which includes a rod 37 that is connected to a collar 38 which has a cylindrical bore 39 in which a drive dish 40 is eccentrically mounted on a shaft 41. At its lower end, each rod 37 is pivotally connected to the drive member 15 by a bolt 43 that extends through a unit, which is similar to the unit 27 of FIG. 4 and includes a rubber annulus that is pressed in the tubular end of rod 37 and vulcanized to a steel bushing which is locked between the arms 16 of the drive member 15 by the bolt 43. It will be evident that, when the drive shaft 41 is rotated, the rods 37 will be reciprocated in the directions indicated by the double-headed arrow 42. Since this reciprocating movement has a horizontal component, the movement of the drive member 15 will also have a horizontal component.

Figure 3:
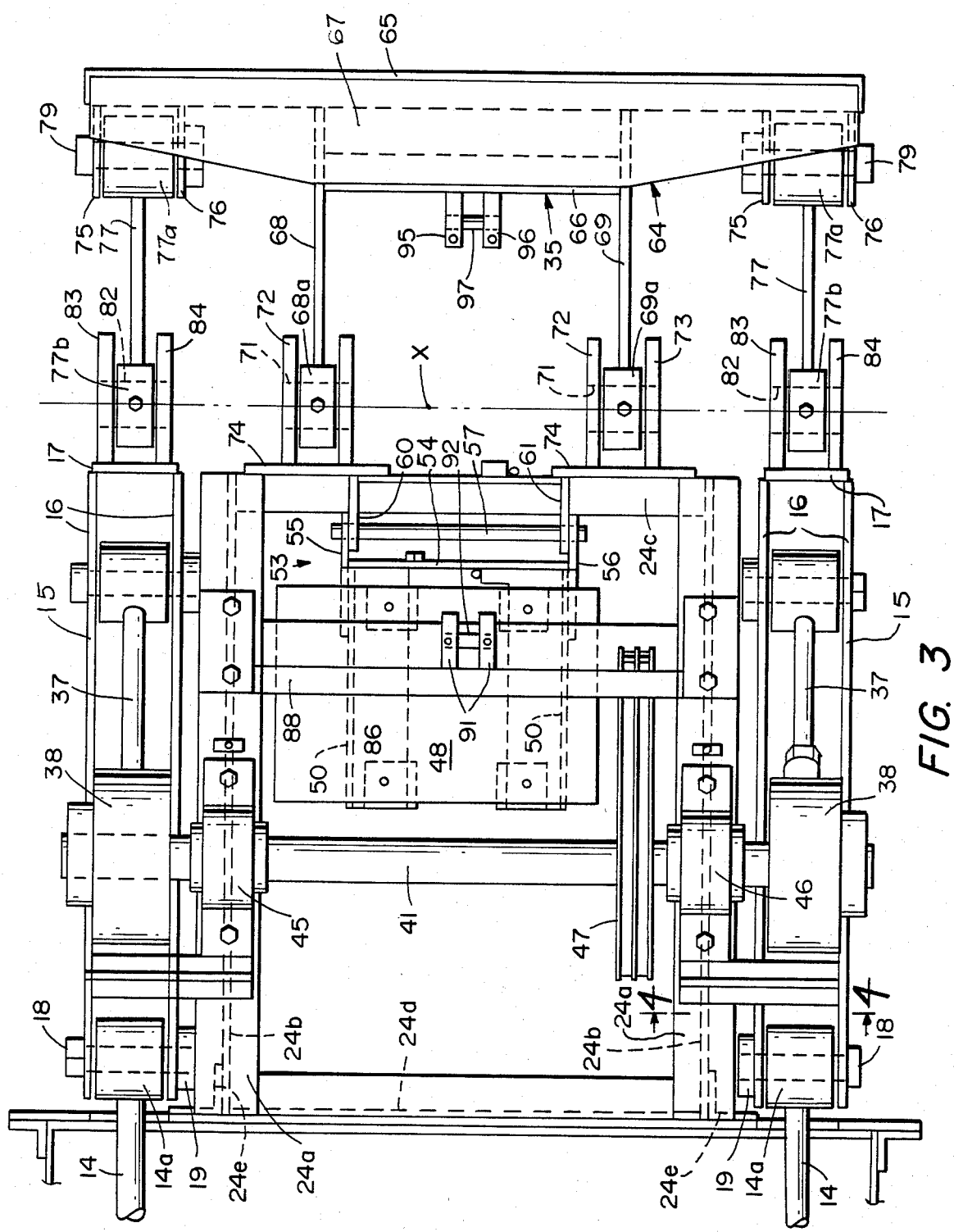
FIG. 3 is a diagrammatic plan of the drive mechanism of FIG. 2.

As seen in FIG. 3, the drive shaft 41 is journalled for rotation in two pillow blocks 45 and 46 that are mounted on the fixed drive box 24, and it is driven by an electric motor 48 through a belt and pulley drive 47 that is keyed to shaft 41 and to the motor shaft. Motor 48 is bolted to a platform which is made up of the upper surfaces of two angle members 50 carried by a bracket 53 which includes a transverse plate 54 and spaced side members 55 and 56, each of which is welded to a side flange of one of the angle members 50. The side members 55 and 56 are pivotally mounted on a bar 57 that is carried by two support members 60 and 61 which are welded to the transverse angle member 24c of the fixed drive box 24.

The stroke-adjusting mechanism 35 (FIGS. 2 and 3) includes a pivot frame 64 made up of two transverse channels 65 and 66, channel 66 being shorter than channel 65, and a plate 67 that is welded across the upper surfaces of the two channels to form a unitary, rigid structure. Two spaced arms 68 and 69, which are welded to the channels 65 and 66 and to the top plate 67, extend away from the channels and are provided with tubular ends 68a and 69a, respectively. Each end 68a and 69a is journalled by needle bearings (not shown) on a short rod 71 which extends between two support arms 72 and 73 that are welded to a plate 74 bolted to channel 24c of the drive box 24. Near each end of the elongate channel 65, a pair of spaced arms 75 and 76 are welded to the channel and to the overhead plate 67. Each pair of arms 75 and 76 extends away from the channel 65 and receives the tubular end 77a of an adjusting arm 77. A bolt 79, which extends between the arms 75 and 76, passes through a rubber mounting which is identical in design to that shown in FIG. 4 and includes a rubber annulus that is pressed in the tubular end of the adjusting arm 77 and is vulcanized to the outer surface of a steel bushing that receives bolt 79. A nut 80 is welded to one face of arm 75 and threadedly receives the end of bolt 79. At its other end, each adjusting arm 77 is provided with a tubular end 77b that is journalled by needle bearings (not shown) on a pin 82 which is secured between spaced arms 83 and 84 welded to the transverse end plate 17 of one of the drive members 15. The axes of four pins 82, 82, 71, 71 are in alignment to define a pivot axis X about which the stroke-adjusting mechanism can be pivoted as a unit.

Figure 2:
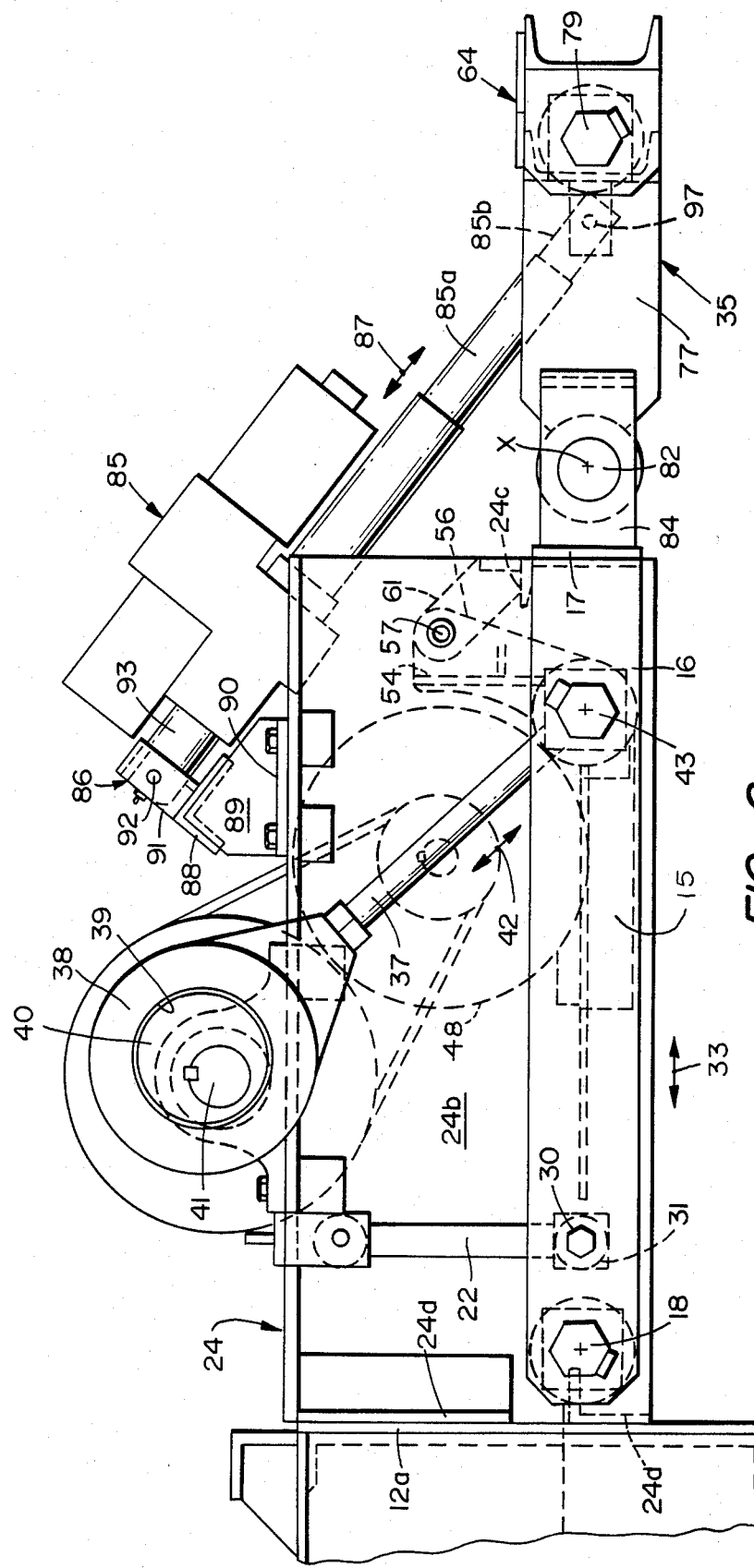
FIG. 2 is an enlarged diagrammatic side elevation of the drive mechanism of FIG. 1.

In accordance with the present invention, the stroke-adjusting mechanism 35 is pivoted about axis X to vary the length of the horizontal movement of the two drive members 15, and this is accomplished by means of a motor-driven actuator 85 (FIG. 2) which is pivotally mounted on a bracket 86 and has a rod 85a that reciprocates in the directions indicated by the double-headed arrow 87. The bracket 86 includes a transverse angle 88 (FIG. 2) which is welded at each end to an upstanding plate 89. Each plate 89 is, in turn, welded to a flat plate 90 that is bolted to one of the side rails 24a of the drive box. Two tabs 91 that are welded to the transverse angle 88 extend upwardly from the angle in spaced relation to receive a pivot pin 92 which also extends through a member 93 (FIG. 2) connected to the actuator 85. At its outer end, the rod 85a has a flat member 85b disposed between two short arms 95 and 96 which are welded to the short channel 66. A pivot pin 97 is rotatably disposed in a cylindrical opening in the rod end member 85b and extends into a generally cylindrical opening in each of the arms 95 and 96. The arms have split ends that extend to the pivot pin openings and screws threaded in tapped openings of the arms are adapted to squeeze the split ends of each arm toward each other to lock the pivot pin in the associated pivot pin openings. In FIG. 2, the extended position of the actuator rod 85a is shown. It will be evident that, since one end of the actuator is anchored on the fixed drive box, retraction of the rod 85a toward the body of the actuator will cause the stroke-adjusting mechanism to be pivoted counterclockwise about axis X, and subsequent extension of the rod will cause clockwise movement of the stroke-adjusting mechanism.

Figure 5:
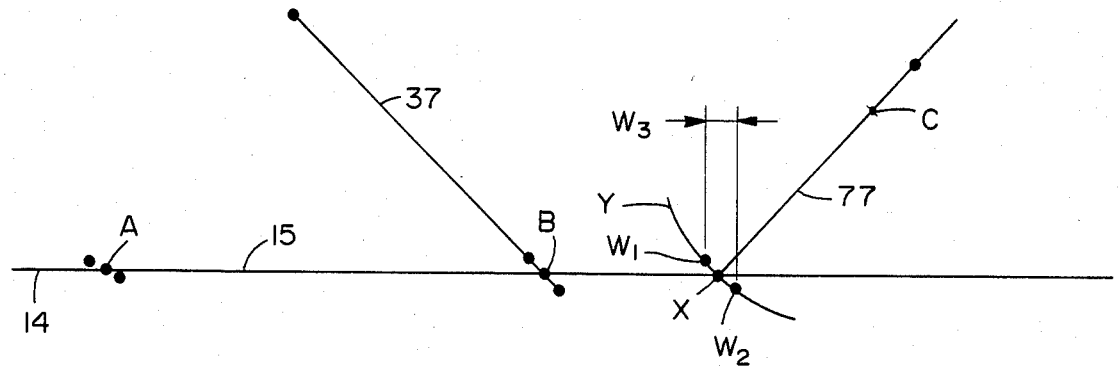
FIGS. 5 and 6 are schematic views illustrating the operation of the linkages of the drive mechanism of FIG. 1.

In FIG. 5 the position of the mechanism 35 that provides maximum reciprocating movement of the drive members 15 is diagrammatically illustrated. It should be noted that, since the actuator rod 85a is locked in fixed position, the pivot frame 64 which is connected to the rod, is also held in fixed position. However, since the adjusting arms 77 are pivoted on the frame 64, they are free to oscillate about the axis defined by the two aligned bolts 79. Thus, when the eccentric drive mechanism is in operation and the drive members 15 are reciprocated, the axis X moves on an arc Y that has a considerable horizontal component. Theoretically, the axis X can move along arc Y until the adjusting arms 77 become axially aligned with the drive members 15, however, actually if the throw of the eccentric mechanism is 1", for example, the arms 77 do not become aligned with the drive members and the movement along the arc is limited by the stroke of the eccentric. Thus, since the stroke of the eccentric is fixed, the angular oscillation of rods 77 is limited so that the outer ends of the rods move through a limited range, as from W1 to W2, a range that has a horizontal component W3. The actuating members 15 and the connecting rods 14 move through corresponding amounts of horizontal travel.

Figure 6:
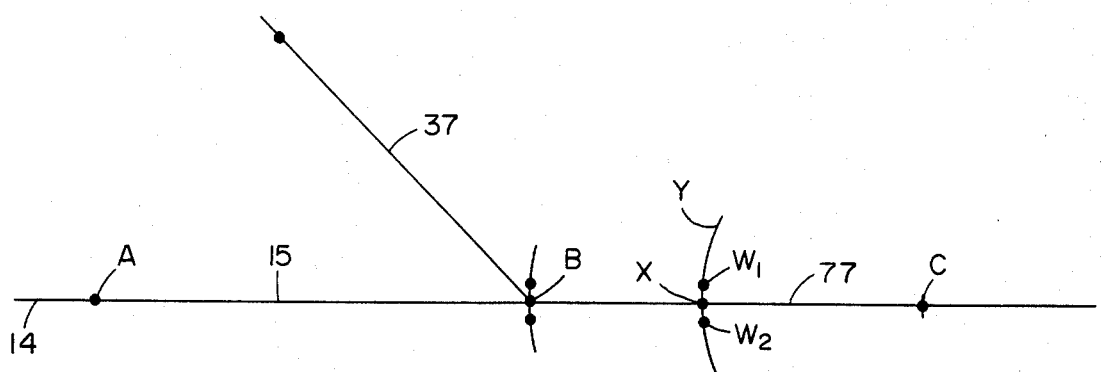

In FIG. 6, the stroke-adjusting mechanism has been pivoted to bring the arms 77 into substantial alignment with the actuating members 15. It will be noted that the arc Y is now oriented so that it has very little horizontal component. Accordingly, even though the eccentric rods 37 continue to move along their generally reciprocating path, the actuating members 15 and the connecting rods have very little reciprocating movement. As a result, the discharge of material from the pan 10 is substantially stopped.

From the foregoing description it will be apparent that the novel, pivotally adjustable linkage of the present invention provides a particularly effective means for varying the range of movement of the feed pan of a material feeder.

I claim:

1. Apparatus for controlling the rate of discharge of material comprising:
   (a) a feeder pan;
   (b) means supporting said feeder pan for reciprocating movement;
   (c) pan drive means having a pan drive member and a connecting rod connected to said feeder pan for imparting a reciprocating movement to said feeder pan through a range of movement, said pan drive member having an end section;
   (d) motor drive means connected to said pan drive means for imparting a reciprocating movement to said pan drive member and said connecting rod; and
   (e) control means having an adjusting arm pivotally connected to said end section of said pan drive member at a pivot axis, said control means comprising a pivot frame for controlling the angular position of said adjusting arm about said pivot axis relative to the direction of travel of said reciprocating movement of said pan drive member and said connecting rod, said end section of said pan drive member being movable over an arcuate path during the reciprocation of said pan drive member and said connecting rod, and means for pivoting said pivot frame for varying the angular position of said adjusting arm, pivotal movement of said pivot frame to vary the angular position of said adjusting arm moves the center of the circle of the arcuate path along which said end section travels to control the extent of reciprocating movement of said pan drive member and said connecting rod, whereby the positioning of said adjusting arm co-extensive with said pan drive member and said connecting rod results in minimum reciprocation of said feeder pan and the positioning of said adjusting arm at an angle relative to the direction of travel of said reciprocating movement of said pan drive member and said connecting rod results in an increased reciprocating movement for said feeder pan.

2. Apparatus as claimed in claim 1 wherein said pan drive member is a generally planar drive member, and wherein said motor drive means includes a reciprocating rod pivotally connected to said pan drive means in angular relation to the plane of said planar drive member, said motor drive means further including an annular member engaging said reciprocating rod for imparting reciprocating movement to said reciprocating rod, said reciprocating rod being arranged to extend from said annular member in the radial direction.

3. Apparatus for controlling the rate of discharge of material as claimed in claim 1 wherein the reciprocating path over which said drive member and said connecting rod travel is generally parallel to the reciprocating path over which said feeder pan travels.

* * * * *